United States Patent
Kozlov et al.

(10) Patent No.: US 11,585,576 B2
(45) Date of Patent: Feb. 21, 2023

(54) COOLING SYSTEM

(71) Applicant: GAS TECHNOLOGY INSTITUTE, Des Plaines, IL (US)

(72) Inventors: Aleksandr Kozlov, Buffalo Grove, IL (US); Yaroslav Chudnovsky, Skokie, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 260 days.

(21) Appl. No.: 16/876,963

(22) Filed: May 18, 2020

(65) Prior Publication Data

US 2020/0363103 A1     Nov. 19, 2020

Related U.S. Application Data (60) Provisional application No. 62/849,537, filed on May 17, 2019.

(51) Int. Cl.
    *F25B 19/04*     (2006.01)
    *F25B 39/04*     (2006.01)
    (Continued)

(52) U.S. Cl.
    CPC .............. *F25B 19/04* (2013.01); *F25B 39/04* (2013.01); *F25B 40/02* (2013.01); *F25B 43/00* (2013.01);
    (Continued)

(58) Field of Classification Search
    CPC .......... F25B 19/04; F25B 39/04; F25B 40/02; F25B 43/00; F25B 2500/14; F25B 9/004;
    (Continued)

(56) References Cited

U.S. PATENT DOCUMENTS

| | | | | |
|---|---|---|---|---|
| 2,703,228 A | * | 3/1955 | Fleisher | F24F 6/06 366/147 |
| 2,919,559 A | * | 1/1960 | Koch | F28C 3/06 62/305 |
| 3,747,362 A | * | 7/1973 | Mercer | F24F 1/022 62/309 |

(Continued)

FOREIGN PATENT DOCUMENTS

| KR | 101935225 B1 * | 4/2019 |
|---|---|---|
| WO | WO 2011/074005 A2 | 6/2011 |

OTHER PUBLICATIONS

Xie, Xiaoyun, et al., "An indirect evaporative chiller," Front, Energy Power Eng. (China), Mar. 1, 2010, 4(1): pp. 66-76.

(Continued)

*Primary Examiner* — Emmanuel E Duke
(74) *Attorney, Agent, or Firm* — Pauley Erickson & Swanson (57) ABSTRACT

A cooling system and method including a cooling chamber with an air inlet, a water inlet, and a cooling fill disposed between the air inlet and the water inlet. The cooling fill configured to put more water surface area in contact with air. The cooling system also including a basin disposed on a side of the cooling fill that is opposite the water inlet, the basin configured to collect the water from the cooling fill. A precooler is included in combination with the basin, the precooler including a heat-mass exchanger in combination with the basin, a blower configured to provide pressurized air through the heat-mass exchanger, and an expansion device configured to depressurize the air after the heat-mass exchanger.

21 Claims, 4 Drawing Sheets

(51) Int. Cl.
*F25B 43/00* (2006.01)
*F28C 1/02* (2006.01)
*F25B 40/02* (2006.01)
*F28C 1/00* (2006.01)

(52) U.S. Cl.
CPC ............ *F28C 1/02* (2013.01); *F25B 2500/14* (2013.01); *F28C 2001/006* (2013.01)

(58) Field of Classification Search
CPC .................. F28C 1/02; F28C 2001/006; F24F 2003/1446; F24F 5/00; F24F 5/0035; Y02B 30/54; Y02B 30/70; F28D 21/0015
See application file for complete search history.

(56) References Cited

U.S. PATENT DOCUMENTS

| | | | |
|---|---|---|---|
| 5,724,828 A * | 3/1998 | Korenic | F28C 1/14 |
| | | | 261/138 |
| 5,961,784 A | 10/1999 | Heikkila et al. | |
| 6,348,088 B2 | 2/2002 | Chung | |
| 6,854,278 B2 | 2/2005 | Maisotsenko et al. | |
| 7,234,309 B2 | 6/2007 | Lee et al. | |
| 7,510,174 B2 | 3/2009 | Kammerzell | |
| 7,815,173 B2 * | 10/2010 | Lin | F28D 3/02 |
| | | | 165/104.34 |
| 9,174,164 B2 | 11/2015 | Glanville et al. | |
| 2011/0174003 A1 | 7/2011 | Wenger | |
| 2018/0169571 A1 * | 6/2018 | Stuckenberg | B01D 53/002 |
| 2019/0242097 A1 * | 8/2019 | Rockenfeller | B01D 53/30 |

OTHER PUBLICATIONS

Morris, Pat., et al., "Spray Enhancement of ACC Performance at Crockett Congeneration Plant," CEC/EPRI Adv. Cooling Strategies / Technologies Conf., May 31-Jun. 2, 2005, Sacramento, California; 20 pages.

* cited by examiner

COOLING SYSTEM

CROSS REFERENCE TO RELATED APPLICATION

This application claims the benefit of U.S. provisional application, Ser. No. 62/849,537, filed on 17 May 2019. The co-pending provisional application is hereby incorporated by reference herein in its entirety and is made a part hereof, including but not limited to those portions which specifically appear hereinafter.

BACKGROUND OF THE INVENTION

This invention relates generally to a cooling system and, more particularly, to a cooling system utilizing precooled or precooled dehumidified air.

Prior art cooling systems such as the Maisotsenko Cycle (M-cycle) systems allow for atmospheric air to be cooled to the dew point temperature (the temperature where air can no longer hold all its water vapor). Examples of M-cycle systems include modified fill, indirect-direct cooling, and utilizing a cooling tower with the modified fill. While such systems ideally allow cooling to the dew point temperature, several problems exist with these current systems. These systems are susceptible to a high pressure drop. They also are limited by the dew point limit of the air. No dehumidification works with these systems. They also often have complicated designs and are not efficient in wet climates. Some prior art cooling and dehumidification systems include the addition of chillers and/or membranes. However, these devices are susceptible to a high pressure drop, high energy consumption, and high cost. Thus there is a continuing need for improved cooling systems.

SUMMARY OF THE INVENTION

The invention generally relates to providing an improved cooling system. The subject invention provides deep cooling of water or air to support residential and commercial appliance operations for increased efficiency, lower cost and performance flexibility. The subject invention has further application in commercial and industrial cooling towers. Embodiments of this invention include an innovative air flow arrangement coupled with effective heat and mass transfer so that the air is cooled and dehumidified prior entering the cooling device. The air cooling and dehumidification is preferably accomplished by a near-atmospheric pressure regeneration technique and/or heat exchange components that have lower energy and water consumption. Adding a blower to the system pressurizes the incoming air and increases the air dew point. This makes it easier for the system to remove moisture from the air. An expander is preferably used to offset the power consumed by the blower. This enables the system to achieve operating at net-zero energy operation.

The general object of the invention can be attained, at least in part, through a cooling system including a cooling chamber which further includes an air inlet, a water inlet, and a cooling fill between the air inlet and the water inlet. The cooling fill puts more water surface area in contact with air. The cooling system also includes a basin on a side of the cooling fill that is opposite the water inlet. The basin collects the water from the cooling fill. A precooler works operates in combination with the basin. The precooler includes a heat-mass exchanger in combination with the basin, and the water therein, and a blower. The blower provides pressurized air through the heat-mass exchanger. The precooler may also include an air-blown cooler.

In embodiments of this invention the precooler includes an expansion device. The expansion device releases air pressure and can provide power to the blower. Various and alternative expansion devices can be incorporated in this invention, such as, for example, an expansion pipe, a throttling valve, and/or a turbo-expander. These devices desirably cool air and condense water vapor from humid air.

In one embodiment of the invention, the heat-mass exchanger includes an air passage extending through the water within the basin to cool the pressurized air and condense water vapor from the humid air. The heat-mass exchanger can also extend outside of the basin. In one embodiment water is introduced from the basin to the heat-mass exchanger. The air passage can be connected to the air inlet of the cooling chamber and the air passage extends through the cooling fill. Additionally, the air passage connects to a supply air for a secondary appliance.

In some embodiments the cooling system further includes a dehumidifier. The dehumidifier can be downstream of the heat-mass exchanger on an air side. The dehumidifier can include a membrane to dehumidify pressurized and precooled air. The system can also include a condensate pump in combination with the heat-mass exchanger to transfer condensate from the heat-mass exchanger to a cold load heat exchanger of the cooling system. A water pump in combination with the basin can transfer the water from the basin to the cold load heat exchanger and/or the water inlet of the heat-mass exchanger.

The invention also includes a method of operating a cooling system. In embodiments of the invention, the method includes putting air in contact with water in a cooling fill. Cooled water is collected in a basin. The cooled water in the basin can cool or cool and dehumidify pressurized air in a heat-mass exchanger. The method preferably also includes releasing the cooled or cooled dehumidified pressurized air to the cooling fill, and pressurizing an air supply into the pressurized air. This can be done with a blower or compressor upstream of the heat-mass exchanger.

Embodiments of the method include dehumidifying the pressurized air between the blower and the heat-mass exchanger. The blower or compressor increases an air dew point to remove moisture from the pressurized air. The method also produces power from the pressurized air in a turbo-expander. The cooled or cooled dehumidified air is mixed with ambient air entering the cooling chamber. Finally, the method may include introducing the cooled or cooled dehumidified air to a supply air of a secondary system.

BRIEF DESCRIPTION OF THE DRAWINGS

Other objects and advantages will be apparent to those skilled in the art from the following detailed description taken in conjunction with the appended claims and drawings, wherein:

DETAILED DESCRIPTION OF THE INVENTION

The present invention provides a cooling system using a near-atmospheric pressure regeneration technique which allows moisture removal from incoming ambient air to lower absolute humidity below ambient level. The cooling system also can harvest water from ambient air and use that water to compensate (fully or partially depending on the ambient humidity) evaporative losses. Therefore, the subject invention addresses temperature limits for conventional evaporative cooling (e.g., conventional cooling tower, evaporative direct or indirect air conditioner) as the wet bulb temperature.

In the subject invention, which is described in relation to the descriptions and figures below, air is precooled or precooled and dehumidified by a heat-mass exchanger. In some embodiments the heat-mass exchanger can be inside a basin below an evaporative fill. In some embodiments the heat-mass exchanger includes a pressurized membrane. The pressurized heat-mass exchanger may be inside or outside of the basin. Some embodiments can also use a turbo-expander to release air pressure and produce work that is used to drive the blower or compressor. Return air may be used in direct evaporation (swamp cooling) to cool or cool and dehumidify air by indirect evaporation and membrane dehumidification. The dew point temperature is increased in pressurized air. This allows condensing water vapor to form from air at higher temperatures.

Indirect cooling and dehumidification of air by using a membrane of the present invention reduces the air temperature to below ambient air dew point temperature ($T_{DP}$), achieving a cooled water temperature less than ambient $T_{DP}$. The precooler can also be used in commercial and industrial cooling towers. It is also expected not only to break the paradigm of cooled water temperature limit of the ambient wet bulb, but also to cool the water below the ambient dew-point ($T_{DP}$) leading to significantly increased net efficiency of appliances. The precooler can also reduce or eliminate water consumption due to inlet air dehumidification and higher performance.

Figure 1:
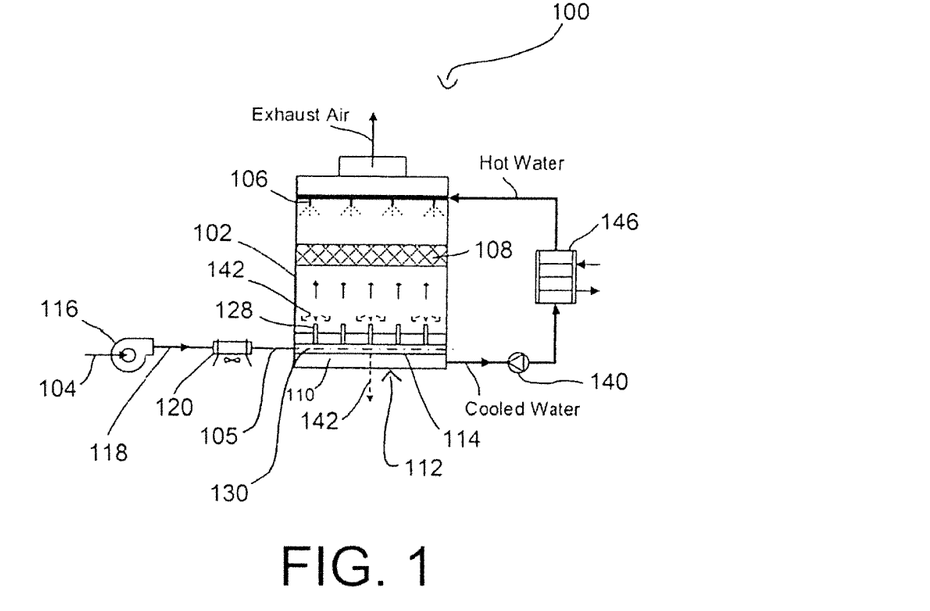
FIG. 1 is a schematic view of a cooling system according to a preferred embodiment of the invention.

FIG. 1 shows a cooling system 100 according to one embodiment of the subject invention. The cooling system 100 includes a cooling chamber 102. The cooling chamber 102 includes a water inlet 106. In one embodiment the water inlet 106 may be in the form of one or more water nozzles. The water inlet 106 supplies water to the cooling chamber 102. Below the water inlet 106 is a cooling fill 108. The cooling fill 108 puts water surface area from the water inlet 106 in contact with an air flow (arrows in FIG. 1). Air enters the cooling chamber 102 via an air inlet 105. In this embodiment the cooling fill 108 is between the air inlet 105 and the water inlet 106 of the cooling chamber 102. The cooling system 100 also includes a basin 110 disposed on an opposite side of the cooling fill 108 from the water nozzles. The basin 110 collects water from the cooling fill 108 as the basin 110 is downstream from the water intake 106 and cooling fill 108. The basin can receive the air intake 104 entering the cooling chamber 102.

Embodiments of the invention include a precooler 112 in combination with the cooling chamber 102. The precooler 112 includes a heat-mass exchanger 114. In one embodiment, the heat-mass exchanger 114 is within the cooling chamber 102, such as at the bottom inside the basin 110.

In the embodiment of FIG. 1, an air intake 104 allows air to enter the cooling system 100 from outside, and upstream of, the cooling chamber 102. Downstream from the air intake 104, a blower 116 or compressor provides pressurized air 118 to the cooling chamber 102. The blower 116 or compressor desirably has a pressure ratio (where pressure ratio is a ratio of pressure at the inlet and outlet of the blower 116 or compressor) in the range of 1.1-1.5, although it is to be understood that the blower 116 of compressor may operate with other suitable pressure ratios.

Before reaching the air inlet 105 the pressurized air 118 is passed through an air-blown cooler 120. Temperature of the pressurized air 118 is higher than the air temperature before the blower 116 due to the air pressurization. The air-blown cooler 120 reduces the temperature of the pressurized air 118 in order to reduce the cooling load on the heat-mass exchanger 114. The pressurized air 118 is then passed through the air inlet 105 into the heat-mass exchanger 114. The heat-mass exchanger 114 includes an air passage 130 passing through the basin 110. The pressurized air is cooled in the air passage 130 within the heat-mass exchanger 114 and also dehumidified by condensing water vapor from the pressurized air due to the humidity of the air. The cooled and dehumidified pressurized air becomes saturated and then is passed through an expansion pipe 128.

The expansion pipe 128 protrudes out from the heat-mass exchanger 114. In some embodiments, such as shown in FIG. 1, more than one expansion pipe 128 may be used. The expansion pipe 128 is used to release additional air pressure from the cooling system 100. The cooled and dehumidified pressurized air is expanded through the expansion pipe(s) 128, and as a result of the expansion, the air is further cooled. Since the cooled and dehumidified pressurized air is saturated, further cooling of the air leads to additional dehumidification of the air and additional formation of condensate 142 released into the cooling chamber 102. The air temperature at the expansion pipe 128 outlet can be lower than the dew point of the ambient air depending on the ambient air conditions and cooling system parameters. The cooling system 100 implements a sub-dew-point cooling tower which can cool water below the dew point temperature of the ambient air. Standard evaporative cooling systems are limited by the wet bulb temperature at given ambient conditions.

Cooled water is transferred out of the cooling chamber 102 with the aid of a water pump 140. The water is then transferred to a cold load heat exchanger 146 which heats the water and introduces the heated water back to the cooling chamber 102 at the water inlet 106. Exhaust air and condensate 142 are released out of the cooling chamber 102. The condensate 142 compensates partially or fully (depending on the ambient conditions and cooling system parameters) for the evaporation losses with the exhaust air from the cooling system 100.

Figure 2:
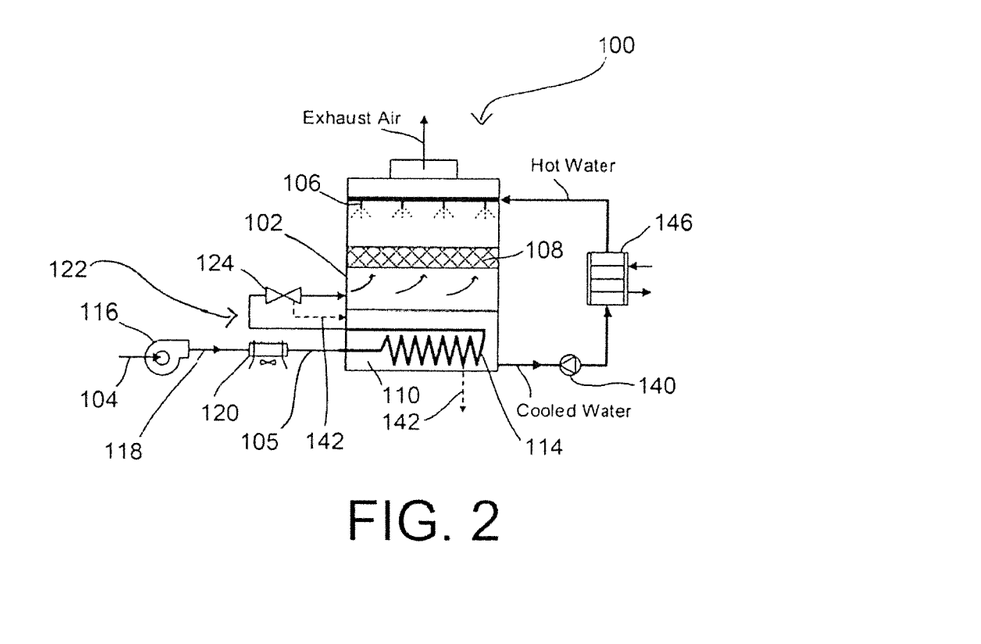
FIG. 2 is a schematic view of a cooling system according to another embodiment of the invention.

In another embodiment, as shown in FIG. 2, an expansion device 122 is used to release additional air pressure from the cooling system 100. In general, the higher the pressure ratio, the higher the dew point temperature of compressed air. The expansion device 122 includes a throttling valve 124 for cooling air and condensing water vapor from the humid air to form condensate 142. In this embodiment, the pressurized air 118 is passed into the cooling chamber 102 via the air inlet 105 where the heat-mass exchanger 114 is again in the basin 110. Cooled water from the basin 110 is pushed out of the cooling chamber 102 with the water pump 140 to the cold load heat exchanger 146. The expansion device 122 works downstream of the heat-mass exchanger 114. Air from the heat-mass exchanger 114 passes through the throttling valve 124 to be cooled. The cooled and dehumidified air is returned to the cooling chamber 102 and passes through the cooling fill 108. The condensate 142 from the throttling valve 124 is also passed into the cooling chamber 102

Figure 3:
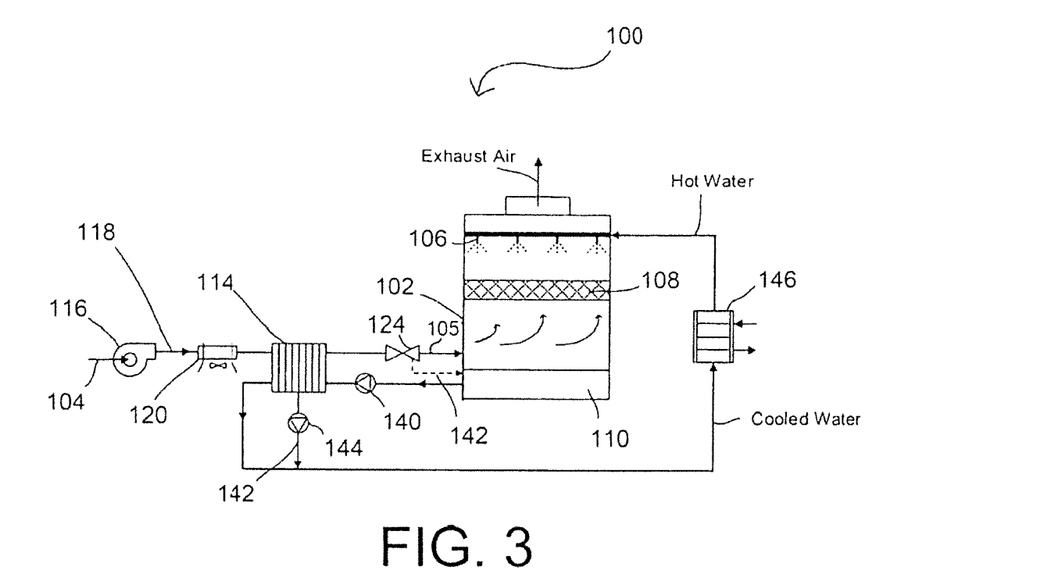
FIG. 3 is a schematic view of a cooling system according to another embodiment of the invention.

FIG. 3 shows another embodiment of the cooling system 100. As shown in FIG. 3, the heat-mass exchanger 114 can also be located outside of the cooling chamber 102. The heat-mass exchanger 114 extends outside of the basin 110. The pressurized air 118 goes through the air-blown cooler 120 and then into the heat-mass exchanger 114 before entering the cooling chamber 102. The air is cooled or cooled and dehumidified (depending on the ambient conditions and cooling system parameters) in the throttling valve 124 which transfers air via the air inlet 105 and adds condensate 142 into the cooling chamber 102. In some embodiments, water enters the external heat-mass exchanger 114 from the basin 110 via the water pump 140. The water then exits the heat-mass exchanger 114 via a water loop towards the cold load heat exchanger 146. Additionally, a condensate pump 144 pumps condensate 142 from the heat-mass exchanger 114 into the water loop for the cold load heat exchanger 146.

Figure 4:
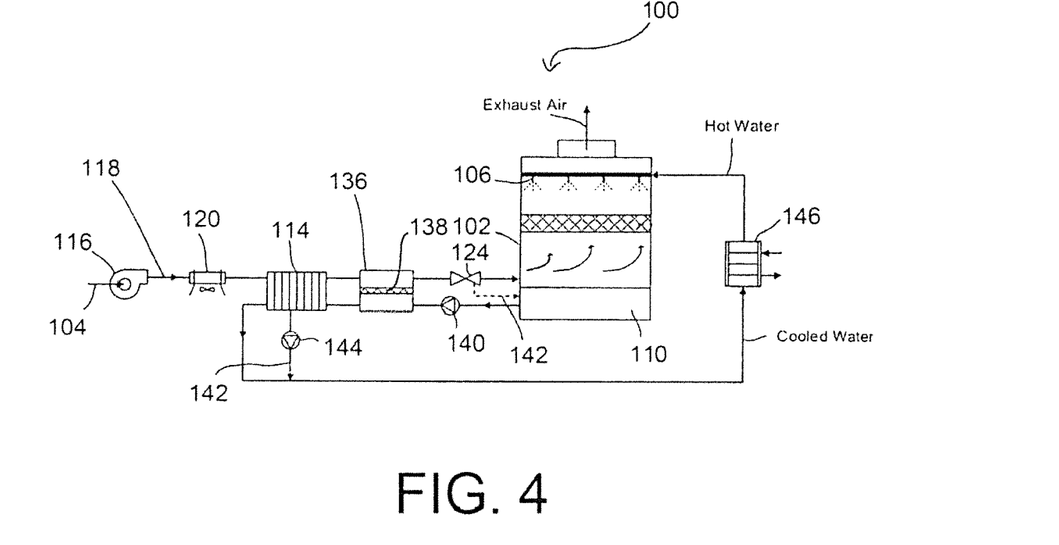
FIG. 4 is a schematic view of a cooling system according to another embodiment of the invention.

FIG. 4 shows air pressurized and dehumidified by a membrane dehumidifier 136 with membrane 138. After pressurized air 118 is cooled in the heat-mass exchanger 114, the air enters the dehumidifier 136. The membrane 138 dehumidifies the air prior to entering the cooling chamber via the throttling valve 124. Water pumped out of the basin 110 via the water pump 140 enters the dehumidifier 136 before entering the heat-mass exchanger 114. The dehumidifier 136 is downstream of the heat-mass exchanger 114 on an air side, and the dehumidifier 136 is upstream the heat-mass exchanger 114 on a water side. The membrane 138 inside the dehumidifier 136 can dehumidify pressurized air and dehumidity pre-cooled air. In this embodiment, the higher the pressure ratio, the higher the dew point temperature of the compressed air in the heat-mass exchanger 114 or in the membrane 138 condenser. This makes it easier for the system to dehumidify the air.

Figure 5:
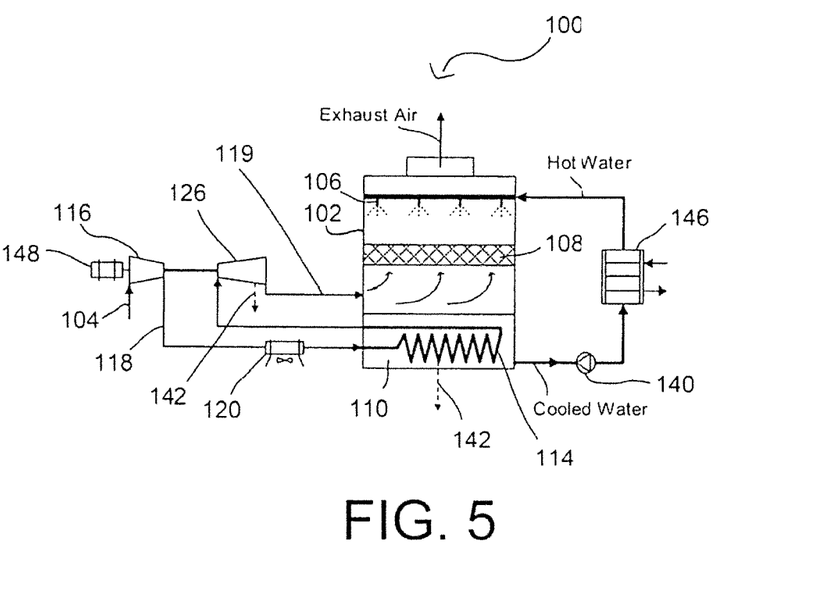
FIG. 5 is a schematic view of a cooling system according to another embodiment of the invention.

FIG. 5 shows a heat-mass exchanger 114 within the bottom of the cooling chamber 102, also inside the basin 110. This embodiment includes a motor 148 to drive the blower or compressor 116. The blower or compressor 116 pressurizes the air from the air intake 104. From the blower 116, pressurized air 118 is transferred through the air-blown cooler 120 into the heat-mass exchanger 114. Additional air pressure from the blower 116 can be diverted into a turbo-expander 126. The turbo-expander 126 can also be used to drive the blower 116. The turbo-expander 126 creates cooled dehumidified air 119 and condensate 142. The water condensate 142 can be pumped to the cooling basin 110. The cooled and dehumidified air 119 can then be released into the cooling chamber 102. In some embodiments the turbo-expander 126 can also receive pressurized air from the heat-mass exchanger 114. This pressurized air can also be recycled to form cooled dehumidified air 119 to re-enter the cooling chamber 102. The water condensate 142 from the heat-mass exchanger 114 can be pumped to the cooling basin 110.

Figure 6:
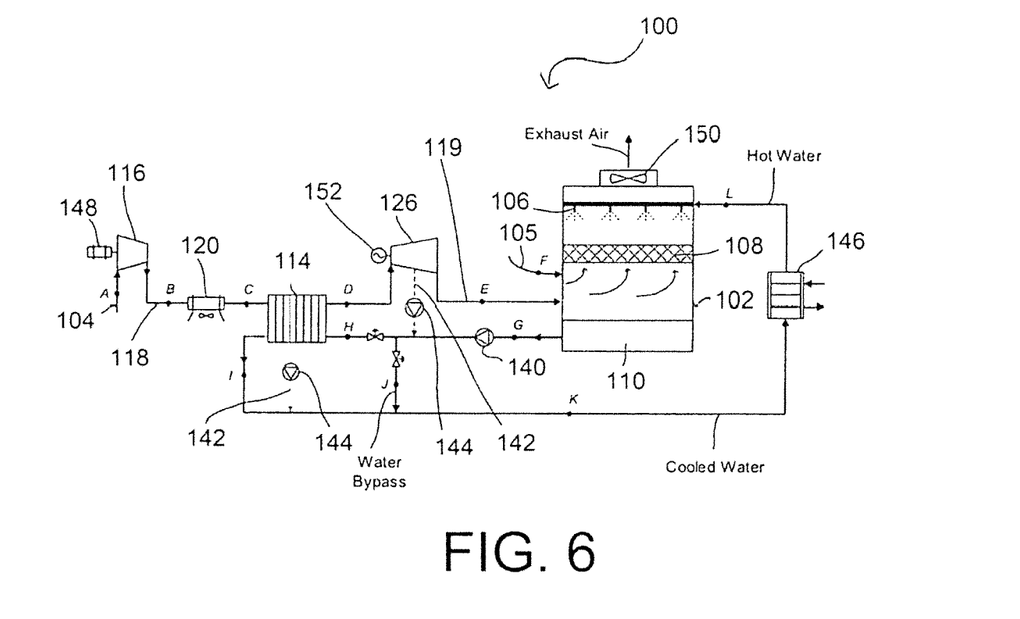
FIG. 6 is a schematic view of a cooling system according to another embodiment of the invention.

FIG. 6 shows another embodiment of the cooling system 100 where the heat-mass exchanger 114 is outside the basin 110. Air enters the air intake 104 at point A. Air is converted to pressurized air 118 after passing through the blower 116. The blower 116 can be powered by the motor 148. The pressurized air 118 is transferred to the air-blown cooler 120 (B) and to the heat-mass exchanger 114 external of the basin 110 (C). In this embodiment, the air leaves the heat-mass exchanger 114 to enter the turbo-expander 126 via pathway D. The turbo-expander can generate power with an electric generator 152. The cooled dehumidified air 119 from the turbo-expander 126 enters the cooling chamber 102 via pathway E. In this embodiment, cooled dehumidified air is mixed with ambient air entering the cooling chamber 102. The air flowrate ratio (e.g., the ratio of the ambient air flowrate and cooled dehumidified air flowrate) is desirably in the range of 0-3.0, although it is to be understood that the cooling system 100 may operate with other flow rate ratios. The cooled dehumidified air 119 enters via pathway E from the turbo-expander 126, and ambient air enters the cooling chamber 102 via the air inlet 105 (pathway F). Meanwhile, condensate 142 generated from the turbo-expander 126 is pumped to a water loop with a condensate pump 144.

Water collected in the basin 110 is pumped out of the cooling chamber 102 with water pump 140 (pathway G). Proceeding to the heat-mass exchanger 114, the water may meet and mix with the condensate 142 from the turbo-expander 126. While some water can pass through pathway H to the heat-mass exchanger 114, an optional water bypass can divert some water away from the heat-mass exchanger 114 through pathway J. This water bypass may or may not be used and can also be controlled to decipher how much water, if any, is bypassed away from the heat-mass exchanger. Any bypassed water is passed through pathway K leading to the cold load heat exchanger 146. The non-bypassed water passes through pathway H to the heat-mass exchanger 114. After heat is transferred from the air, to water, in the heat-mass exchanger 114, the water exits the heat-mass exchanger 114 via pathway I to join the cooled water directed toward the cold load heat exchanger 146. Hot water can then exit the cold load heat exchanger 146 and enter the cooling chamber 102 via pathway L. As an example, the parameters of the cooling system 100 according to this embodiment at specific ambient conditions (ambient air dry bulb temperature 35° C. and ambient air humidity 47%) and specified cooling capacity (52.2 kW) of the cold load heat exchanger 146, are also shown in Table 1, below.

TABLE I

Cooling System Parameters

| | | Air | | | | | Water | | | | |
|---|---|---|---|---|---|---|---|---|---|---|---|
| Location | | A (F) | B | C | D | E | G (G) | H | I | J | K (K) | L (L) |
| Flowrate | kg/s | 1.08 (2.7) | 1.08 | 1.08 | 1.08 | 1.057 | 2.26 (2.28) | 0.5 | 0.9 | 1.78 | 2.28 (2.28) | 2.28 (2.28) |
| Temperature | ° C. | 35 (35) | 74.2 | 42.8 | 28.4 | 0.4 | 19.7 (29.4) | 19.6 | 28.4 | 19.6 | 21.4 (29.4) | 27 (35) |
| Absolute pressure | kPa | 101.3 (101.3) | 144.6 | 144.4 | 144.1 | 101.3 | 94 (98) | 172 | 160 | 160 | 158 (158) | 122 (122) |
| Relative humidity | % | 47 (47) | 10.1 | 44 | 100 | 100 | — | — | — | — | — | — |

TABLE I-continued

Cooling System Parameters

| Location | | Air | | | | | Water | | | | | |
|---|---|---|---|---|---|---|---|---|---|---|---|---|
| | | A (F) | B | C | D | E | G (G) | H | I | J | K (K) | L (L) |
| Dew point temp. | °C. | 22 (22) | 27.9 | 27.4 | 27.4 | 0.4 | — | — | — | — | — | — |
| Wet bulb temp. | °C. | 25.6 (25.6) | 39.3 | 32.1 | 27.4 | 0.4 | — | — | — | — | — | — |
| Mixing ratio | g/kg | 16.7 | 16.7 | 16.7 | 16.2 | 3.9 | — | — | — | — | — | — |
| Enthalpy | kJ/kg | 78.1 | 118.7 | 86.2 | 69 | 10.16 | 83.3 (123) | 82.9 | 119 | 82.9 | 90.1 (123) | 113 (146) |

Corresponding to locations identified in FIG. 6, Table 1 shows parameters of the cooling system 100 according to one embodiment. Alphanumeric characters enclosed by parentheses correspond to values for a standard cooling system 100, without air precooling and dehumidification. The ambient air flowrate through the air inlet 105 (pathway F) is 2.7 kg/s for a standard cooling system and zero for the cooling system 100 of the subject invention. As seen from the values in Table 1, the cooling system 100 of the subject invention can achieve cooled water temperature (21.4° C.) below ambient dew point (22° C.). This is achieved while the standard evaporative cooling systems are limited by the wet bulb temperature (25.6° C. in this case) at given ambient conditions. This allows for deeper cooling and deeper air dehumidification in comparison to other systems. Deeper cooling may also be achieved with the addition of other components such as a dehumidifying membrane. Any other suitable components can be added or removed to adjust the pressure ratio of the blower 116 or compressor. Additionally, a fan 150 may be present in any embodiment as needed to facilitate removal of exhaust air from the system 100.

Figure 7:
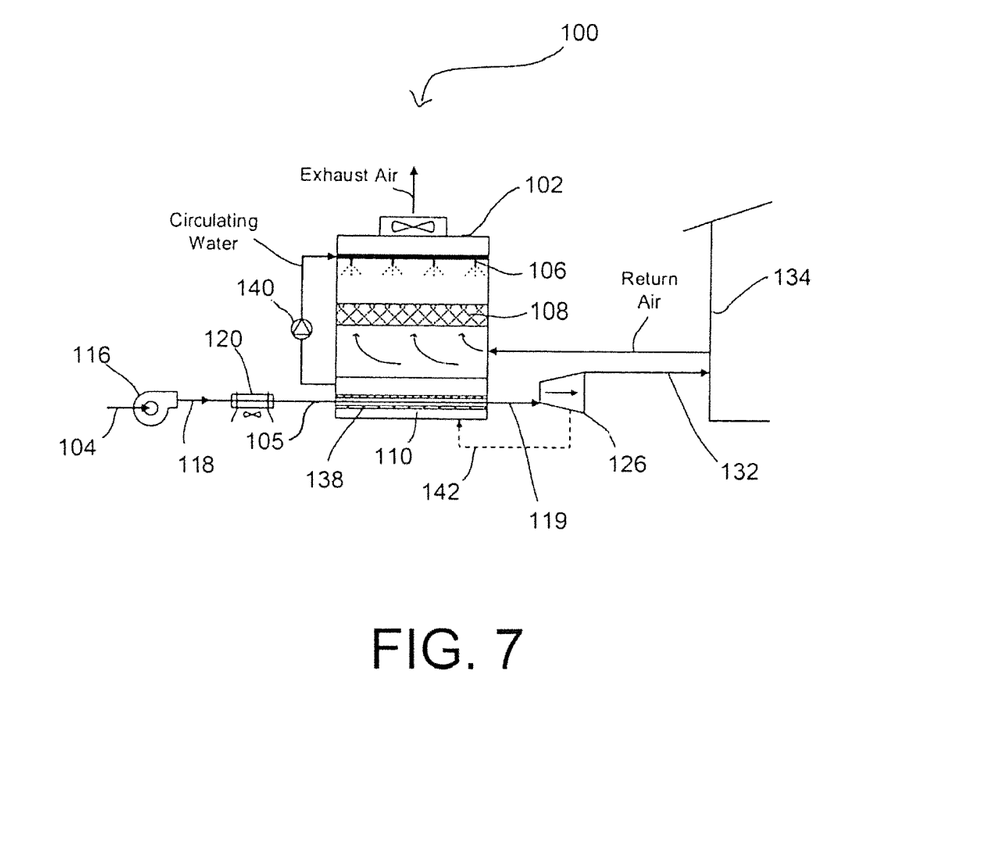
FIG. 7 is a schematic view of a cooling system according to yet another embodiment of the invention.

FIG. 7 illustrates an embodiment using indirect-direct cooling. Air from the air-blown cooler 120 enters the basin 110 inside the cooling chamber 102 through the air inlet 105. In this embodiment, the membrane 138 is inside the basin 110 to dehumidify incoming air. The turbo-expander 126 is downstream of the cooling chamber 102 in this embodiment. Cooled dehumidified air 119 from the membrane 138 inside the basin 110 exits the cooling chamber into the turbo-expander 126. The turbo-expander 126 creates condensate 142 that can be recycled back into the basin 110, and a supply air 132. The supply air 132 can connect to a secondary appliance 134. The secondary appliance 134 may be any suitable residential or commercial appliance for which the cooling system 100 would prove beneficial. Return air can re-enter the cooling chamber from the secondary appliance 134.

Additionally, in some embodiments of the invention water may be circulated throughout the cooling chamber 102. Cooled water may be pumped with the water pump 140 from the basin 110. In one embodiment, the water may be circulated on a water loop exterior from the cooling chamber. Other configurations of the water circulation may also be present. The circulating water is then re-introduced to the cooling chamber via the water inlet. As with the embodiment shown in FIG. 4, air is dehumidified in the subject embodiment by increasing the dew point temperature of the compressed air in the membrane 138, due to the ability of the blower 116 or compressor to use a higher pressure ratio.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A cooling system comprising:
   a cooling chamber including an air inlet, a water inlet, and a cooling fill disposed between the air inlet and the water inlet, the cooling fill configured to put more water surface area in contact with air;
   a basin disposed on a side of the cooling fill that is opposite the water inlet, the basin configured to collect the water from the cooling fill; and
   a precooler in combination with the basin, the precooler including a heat- mass exchanger in combination with the basin, and a blower configured to provide pressurized air through the heat-mass exchanger.

2. The cooling system of claim 1 wherein the precooler further comprises an air-blown cooler in combination with the basin.

3. The cooling system of claim 1 wherein the precooler comprises an expansion device, which comprises an expansion pipe, or a throttling valve, or a turbo-expander configured to cool air and condense water vapor from the humid air.

4. The cooling system of claim 1 wherein the heat-mass exchanger comprises an air passage extending through the water within the basin to cool the pressurized air and condense water vapor from the humid air.

5. The cooling system of claim 4 wherein the air passage is connected to the air inlet of the cooling chamber.

6. The cooling system of claim 4 wherein the air passage extends through the cooling fill.

7. The cooling system of claim 6 wherein the air passage connects to a supply air for a secondary appliance.

8. The cooling system of claim 1 wherein the heat-mass exchanger extends outside the basin and wherein water is introduced from the basin to the heat-mass exchanger.

9. The cooling system of claim 1 further comprising a dehumidifier downstream of the heat-mass exchanger for air.

10. The cooling system of claim 9 wherein the dehumidifier comprises a membrane configured to dehumidify pressurized and precooled air.

11. The cooling system of claim 1 further comprising a condensate pump in combination with the heat-mass exchanger and configured to transfer condensate from the heat-mass exchanger to the basin.

12. The cooling system of claim 1 further comprising a water pump in combination with the basin and configured to transfer the water from the basin to a cold load heat exchanger and/or the water inlet.

13. The cooling system of claim 1, wherein the air inlet is connected to the heat-mass-exchanger, whereby the pressurized air through the heat-mass exchanger is introduced to the cooling chamber through the air inlet.

14. A method of operating a cooling system, the method comprising:
   putting air in contact with water in a cooling fill;
   collecting cooled water in a basin; and
   cooling or cooling and dehumidifying pressurized air in a heat-mass exchanger with the cooled water in the basin.

15. The method of claim 14, further comprising releasing the cooled or cooled dehumidified pressurized air to the cooling fill.

16. The method of claim 14, further comprising pressurizing an air supply into the pressurized air with a blower or compressor upstream of the heat-mass exchanger.

17. The method of claim 16 further comprising cooling the pressurized air between the blower and the heat-mass exchanger.

18. The method of claim 17 wherein the blower or compressor increases an air dew point temperature to remove moisture from the pressurized air.

19. The method of claim 14 further comprising producing power from the pressurized air in a turbo-expander.

20. The method of claim 14 further comprising mixing the cooled or cooled dehumidified air with ambient air entering the cooling chamber.

21. The method of claim 14 further comprising introducing the cooled or cooled dehumidified air to a supply air of a secondary system.

* * * * *

UNITED STATES PATENT AND TRADEMARK OFFICE
CERTIFICATE OF CORRECTION

| | | |
|---|---|---|
| PATENT NO. | : 11,585,576 B2 | Page 1 of 1 |
| APPLICATION NO. | : 16/876963 | |
| DATED | : February 21, 2023 | |
| INVENTOR(S) | : Aleksandr Kozlov and Yaroslav Chudnovsky | |

It is certified that error appears in the above-identified patent and that said Letters Patent is hereby corrected as shown below:

In the Specification

Column 1, after the title and first paragraph and before "BACKGROUND OF THE INVENTION" insert:
-- STATEMENT REGARDING FEDERALLY SPONSORED RESEARCH OR DEVELOPMENT
This invention was made with government support under U.S. Department of Energy Award DE-FE-0031833. The government has certain rights in the invention. --

Signed and Sealed this
Fifth Day of September, 2023

Katherine Kelly Vidal
*Director of the United States Patent and Trademark Office*